C. M. HAYNES.
FINGER PIECE MOUNTING FOR EYEGLASSES.
APPLICATION FILED OCT. 3, 1914.
1,345,488.
Patented July 6, 1920.
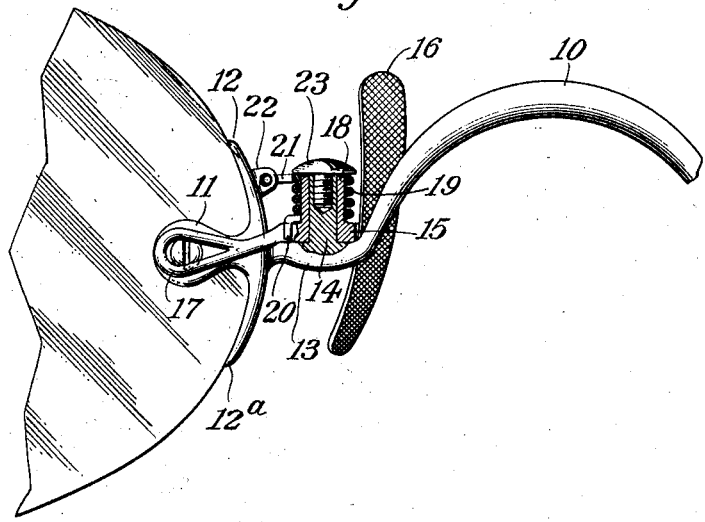
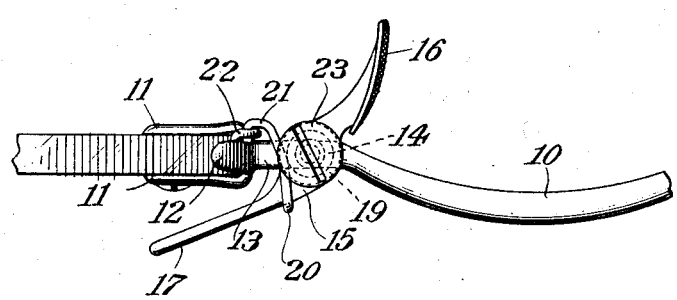
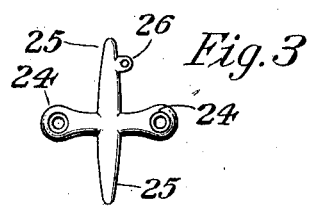
Witnesses:
Hugo B Polson
William P Johnson
Inventor
Charles M. Haynes,
By his Attorney
S. S. Dunham.

UNITED STATES PATENT OFFICE.

CHARLES M. HAYNES, OF CHILLICOTHE, OHIO, ASSIGNOR TO AMERICAN OPTICAL COMPANY, OF SOUTHBRIDGE, MASSACHUSETTS, A VOLUNTARY ASSOCIATION OF MASSACHUSETTS.

FINGER-PIECE MOUNTING FOR EYEGLASSES.

1,345,488.

Specification of Letters Patent.

Patented July 6, 1920.

Application filed October 3, 1914. Serial No. 864,837.

*To all whom it may concern:*

Be it known that I, CHARLES M. HAYNES, a citizen of the United States, residing at Chillicothe, in the county of Ross and State of Ohio, have invented certain new and useful Improvements in Finger-Piece Mountings for Eyeglasses, of which the following is a full, clear, and exact description.

In so-called "fingerpiece" mountings for eyeglasses as heretofore constructed, it has been exceedingly difficult to put the parts together. The parts are all minute and no satisfactory or facile means have been devised to hold them in alinement while setting them up, particularly where repairs have been made. These parts consist of a fingerpiece lever with a pivot hole, (this hole alines with a threaded hole in the pivot seat on the bridge end), a coiled spring above the lever, and a threaded pivot post or screw. The spring surrounds the post and has one end anchored on the lever and one on the bridge connection. To set up this combination the lever is placed over the seat, its pivot hole matching the threaded hole in the seat; the spring is placed over the post, and the post inserted through the hole in the lever and into the threaded hole in the seat. All the parts have to aline. It is exceedingly difficult to hold the parts thus while driving home the screw. It often gets askew or out of line, and the threads are either stripped or jammed or injured, reducing the durability of the device, if not totally destroying it. After the screw has been driven home it is necessary then to anchor the ends of the spring, a rather difficult operation in which the springs are often broken.

The chief object of my invention is to provide a fingerpiece mounting that will automatically hold the parts together in alinement before the screw post is applied, thus avoiding any tendency to strip or strain the threads, and making the assembly of the parts a matter of ease and facility.

In removing and replacing the eyeglasses the wearer is very apt to put excessive pressure on the fingerpiece, thereby straining the parts, especially parts that are removably or detachably connected, as with screws or the like. Moreover, the springs employed are usually held in place by screws, and as breakage of springs is not infrequent the necessary removal and replacement of screws soon causes wear on the threads, both male and female, especially if the screws have been already injured by the excessive pressures referred to or in assembling the parts. The result is that the mounting wears out and becomes useless much more quickly than would be the case if the users were uniformly careful in handling the glasses and the springs did not require renewal. Further objects, therefore, of my invention are to provide a fingerpiece mounting of a more durable type, which can withstand misuse for a considerable period, and to provide a mounting in which such screws as may be employed are subjected to no greater stresses than they can easily sustain without injury, and to further provide a mounting in which the screws are not subjected to any assembling or alining stresses, and which will also be free from operating stresses, the screw being out of contact with the operating parts, and the parts being alined independently of the screw. To these and other ends, the invention consists in the novel features of construction and combination of elements hereinafter described.

Of the various constructions in which the invention can be embodied I have selected for illustration and specific description herein the one that at the present time is believed to exhibit the invention in its most convenient and effective form. This embodiment is illustrated in the accompanying drawing, in which—

Figure 1 is a front view, partly in vertical section.

Fig. 2 is a plan view.

Fig. 3 is a plan view of a blank from which a part of the device is made.

The bridge piece 10 is formed (at each end) with straps 11 to embrace the lens and with the usual arms 12, 12ª, extending above and below the lens and bearing on the edges of the lens to prevent pivotal movement thereof in its own plane. Between the arch of the bridge piece and the straps 11 the bridge piece has a short horizontal portion 13 provided with a vertical post or stem 14, preferably integral therewith. The lever 15, which at its rear carries the nose-clip 16 and at its front is formed with a finger piece 17, is formed between its ends with an aperture surrounded by a vertical sleeve 18. This sleeve, preferably integral with the lever, fits the stem 14 so that the latter constitutes the fulcrum of the lever. The helical spring 19, which is provided to press the clip against the nose, encircles the sleeve 18 and has its lower end 20 hooked under the lever 15 while its upper end 21 is hooked securely in a ring or eye 22 on the upper lens-bracing arm 12 which, it will be remembered, is a part of the bridge piece 10. The spring 19 being of the "close" type, it will be seen that if the eye 22 is not too high on the arm 12 there will be no special tendency for the spring to slip off the sleeve 18 even if the bent lower end of the spring is not hooked under the finger-piece lever but merely bears on the front edge of the latter. On the contrary, to take the spring off the sleeve without disengaging the upper end from the eye 22 would require no little force. Such removal would involve a pivotal movement of the entire spring upward about the eye 22 as a center, and inspection of the drawing will readily make it plain that such pivotal movement would entail more or less expansion of the spring radially from its axis. It will therefore be seen that so long as the spring is unbroken and retains its resiliency (in short, so long as it is serviceable) there is not only no tendency for the spring to be displaced of its own accord, but that its tendency is rather to resist displacement. There is thus no necessity for any special spring-securing or fastening device so long as the spring is in serviceable condition. But if it should break, say between the hooked end 22 and the first coil and thus allow the eye-glasses to fall, the spring could slip off, followed by the finger-piece lever 15. To prevent such results I provide a screw 23, fitted into the top of the post 14 and having a head extending preferably over the top of the spring but at least far enough over the top of the sleeve 18 to hold the same in place if the spring should break. The spring is preferably short, axially, so as to exert no pressure on the screw-head, in which case there would be no stress whatever exerted on the screwhead; but even if a longer spring were used, so that it bore against the head, the stress would be rather in the nature of an axial pull and would be resisted by all the turns of the thread. As such a stress is the one that a screw is best adapted to withstand it will be seen that even in the extreme case mentioned the screw is not liable to be injured; especially if it fits the hole tightly and is well set in so as to resist unscrewing by the repeated flexure of the spring. In practice, however, I prefer to use a spring short enough to keep it practically out of contact with the screwhead.

Another important advantage of the invention flows from the fact that the pressure of the finger or thumb on the lever 15 is exerted on the post 14 at a point where the latter is best able to withstand such pressure, namely, at the bottom of the post, where it joins the part 13 of the bridge-piece. The result is that possibility of bending the post, even under the most severe conditions of use, is practically eliminated; and this is true even when the post is riveted or screwed into place instead of being integral with the bridge-piece.

The various parts of the mounting can be cheaply manufactured by die-pressing or stamping and bending. For example, the lens-holding device can be formed from the sheet-metal blank shown in Fig. 3, by bending the arms 24 to form the straps 11, 11, the arms 25 to form the braces 12, 12ª, and the perforated lug 26 to form the eye 22. The device can then be soldered or riveted, or otherwise fastened, to the end of the bridge-piece.

The facility of assembling the parts is at once apparent. The sleeve 18 of the lever 15 is slipped over the post 14, extending upward from the bridge 13, the spring 19 is then slipped over the post 14, one end 20 slipped over the lever 15 and the other end 21 slipped through the eye 22. The post 14 has automatically alined the parts and holds them in place. The parts as now set up will operate even without the use of the cap screw 23, which is added as an extra precaution and as a finish to the whole structure. This automatic alinement is of first importance. The parts can be set up quickly by hand; they will not get out of line while the spring ends are being set, and they will not fall out of line while the retaining screw is being put in place. It prevents straining or stripping the screw threads, and the operating lever and spring will have no tendency to back out the screw while the levers are operated; all operating strains are entirely removed from the screw, thus insuring speed and facility of assembling and repairing, a long and stable bearing for the lever and a durability and wearing qualities heretofore not available in this type of mounting. In operation the coil spring presses the guard 16 inward toward the nose. To place the mounting on the nose the guards are separated by means of the fingerpiece levers 17. When released the springs drive the guards inward into contact with the nose and hold them in place thereon.

It is to be understood that the invention is not limited to the construction herein specifically illustrated and described, but can be embodied in other forms without departure from its spirit.

I claim:

1. Lens connecting means, a pivot post arising therefrom having a counter-bore, a fingerpiece lever having a tubular sleeve surrounding the post, a coiled spring surrounding the sleeve intermediate its ends, having one end anchored on the lever and one end anchored on the lens connecting means, and a cap in the counter-bore overhanging the spring.

2. Lens connecting means, a headless pivot post thereon, a fingerpiece lever having a tubular sleeve surrounding the pivot post, and a coiled spring surrounding the sleeve having one end anchored on the lever and the other end anchored on the lens holding means.

3. A guard lever having a pivot opening, means surrounding the pivot opening adapted to hold a coiled spring in alinement therewith, a coiled spring thereon, lens connecting means, fixed pivot bearings thereon slidable within the spring holding means, and detachable caps on the pivot bearings.

4. Lens holding means, a fixed headless tubular post arising therefrom, a fingerpiece lever having a tubular sleeve surrounding the tubular post, a coiled spring surrounding the sleeve having one end anchored on the lever and the other end anchored on the lens holding means, and a cap secured in the top of the tubular post and overhanging the spring.

In testimony whereof I affix my signature in the presence of two subscribing witnesses.

CHARLES M. HAYNES.

Witnesses:
 WILBY G. HYDE,
 HAZEL C. HOUGH.